United States Patent [19]

Ipnar et al.

[11] 4,026,476
[45] May 31, 1977

[54] SPREADING AND DISTRIBUTING MECHANISM FOR A MANURE SPREADER

[75] Inventors: Albert J. Ipnar, East Earl; Warren H. Brackbill, Paradise, both of Pa.

[73] Assignee: Sperry Rand Corporation, New Holland, Pa.

[22] Filed: Mar. 1, 1976

[21] Appl. No.: 662,680

[52] U.S. Cl. .................................. 239/680; 74/219
[51] Int. Cl.² ........................................ A01C 23/00
[58] Field of Search .......... 239/672, 676, 679, 680; 74/219, 11

[56] References Cited

UNITED STATES PATENTS

| 309,987 | 12/1884 | Smith | 239/680 X |
|---|---|---|---|
| 1,313,595 | 8/1919 | Hartsock | 239/680 X |
| 1,790,730 | 2/1931 | Synck | 239/680 X |
| 1,820,528 | 8/1931 | Claar | 239/680 |
| 2,653,028 | 9/1953 | Templeton | 239/680 X |
| 2,704,670 | 3/1955 | Vutz et al. | 239/680 X |
| 3,175,830 | 3/1965 | Lepp | 239/671 X |
| 3,228,701 | 1/1966 | Smith et al. | 239/680 X |
| 3,295,855 | 1/1967 | Sadler et al. | 239/680 X |
| 3,632,050 | 1/1972 | Lee | 239/676 |
| 3,722,307 | 3/1973 | Campbell | 74/219 |

Primary Examiner—Johnny D. Cherry
Assistant Examiner—Michael Mar
Attorney, Agent, or Firm—John R. Flanagan; Frank A. Seemar; Michael R. Swartz

[57] ABSTRACT

An improved beater mechanism for a manure spreader uniformly spreads and distributes a thin layer of shredded manure particles to the sides and the rear of the spreader over the ground in a wide spread coverage pattern, substantially greater in width than the width of the spreader. The mechanism comprises a main beater having saw-toothed paddles and being disposed in the rear end of the spreader with a wide spread distributor beater positioned upwardly and rearwardly therefrom in the path of the manure discharged by the main beater such that the discharged manure strikes the outer marginal edge portions of the distributor blades when the same are located in the upper forward quadrant of a cylindrical zone defined by the rotation of the distributor beater. Additionally, a third beater is provided having saw-toothed paddles which level the load of manure and assist the main beater in shredding the manure into smaller particles for distribution by the wide spread distributor beater. Each beater is driven in the same direction by a common drive which drives the wide spread distributor beater 30-50 per cent faster than the main beater.

11 Claims, 4 Drawing Figures

SPREADING AND DISTRIBUTING MECHANISM FOR A MANURE SPREADER

BACKGROUND OF THE INVENTION

1. FIELD OF THE INVENTION

The present invention relates generally to improvements in manure spreaders and more particularly is directed to an improved mechanism for spreading and distributing material stored in the spreader.

2. DESCRIPTION OF THE PRIOR ART

Manure spreaders generally consist of an open-end spreader box into which material, such as manure, is loaded for subsequent unloading and spreading, a conveyor within the spreader box for advancing the load of manure rearwardly toward the open end and a beater mechanism located at the open end of the spreader box for spreading and distributing manure stored therein over the ground. These individual components of the manure spreaders have been known and used for almost a century. Many necessary and valuable improvements have been made on the respective component parts throughout this time, especially improvements relating to the spreading and distributing beater mechanism.

One of the early manure spreader constructions is shown and described in U.S. Pat. No. 309,987, granted to Smith on Dec. 30, 1884. The spreader of this patent employs a beater mechanism comprised of two vertically spaced apart beaters rotatably mounted and transversely disposed in the open end of the spreader box. Each beater comprises a cylindrical drum having rows of spiked teeth projecting outwardly from the periphery of the drum. An apron conveyor conveys the manure rearwardly to the spiked toothed drums which are adapted to be rotated in opposite directions. The manure passes between the spiked-tooth drums and is spread onto the ground in a width generally limited to the width of the drums.

Various improvements were made to these early spreaders, one of which being directed to the spread width of the spreader. An example of such an improvement is shown in U.S. Pat. No. 1,313,595, granted to Hartsock on Aug. 19, 1919, wherein a distributor beater was mounted rearwardly of the spiked-tooth beaters. The distributor comprises a plurality of blades so arranged that upon rotation thereof the manure was spread a width greater than the width of the spiked-toothed beaters. This arrangement is commonly referred to today as a "wide spread" beater.

Although the spiked-tooth beater spreader with the wide spread attachment experienced much success, one disadvantage was the inability of this type of spreader to effectively spread fine materials. One solution was proposed in U.S. Pat. No. 1,820,528, granted to Claar on Aug. 25, 1931. Claar attached flat plates across the spiked teeth to form a paddle wheel configuration thereby converting the spreader for use with fine pulverized material, such as lime.

Another disadvantage of the spiked-tooth beater spreaders were their inability to handle a compacted material, such as, material having a pasty consistency or material having large lumps dispersed therein. Thus, the paddle-type beater was introduced. The paddle beater comprised a series of paddles having a generally flat body portion with notched outer peripheral edges and arranged on a rotatable shaft such that upon rotation thereof, the notched paddles would aggressively engage and scoop up the material, tear and shred the material into smaller particles and then distribute the same rearwardly of the spreader. The paddle-type beater can be found in manure spreaders having a single beater arrangement, such as in U.S. Pat. No. 3,632,050 granted to Lee on Jan. 4, 1972 and also in double beater spreaders as shown by U.S. Pat. No. 3,722,307 granted to Campbell on Mar. 27, 1973.

Although, the paddle type beater spreader was an improvement over the spiked-toothed beater spreaders, especially in its ability to handle all types and consistencies of material, it had other limitations. Such limitations derive from its inability to achieve a wide spread pattern and uniform distribution of material over the ground in an even thin layer.

SUMMARY OF THE INVENTION

The present invention overcomes the aforementioned disadvantages of prior art spreaders by providing an improved spreading and distributing mechanism for manure spreaders having the capability of efficiently spreading and distributing all types and consistencies of material uniformly over the ground in a wide spread coverage pattern.

According to the present invention, a manure spreader of the type having an open-end spreader box mounted on a wheeled frame and including a conveying device operable with the box to advance material such as manure toward the open end of the spreader box, is provided with an improved spreading and distributing mechanism. The improved mechanism comprises a main beater having a rotatable shaft mounted transversely between the sidewalls of the spreader box in the vicinity of its open end, and a wide spread distributor beater having a rotatable shaft with a series of distributor blades mounted thereon to distribute the material to the sides and rear of the spreader as it is propelled across the ground. The main beater includes an arrangement of saw-toothed paddles which first engage and shred the material as it is advanced by the conveying device and then direct the same rearwardly to the wide spread distributor beater for distribution thereof to the sides and the rear of the spreader, in a spread pattern substantially greater than the width of the spreader.

More particularly, the wide spread distributor beater is positioned upwardly and rearwardly from the main beater such that the main flow of the material discharged over the main beater strikes the marginal edge portions of the distributor blades when the blades are located in the upper forward quadrant of a cylindrical zone defined by the rotation of the distributor blades. Specifically, the angle of inclination of the plane that passes through the axes of the main beater shaft and the wide spread distributor beater shaft is within a range between 40°-60° with respect to the horizontal plane that passes through the main beater shaft.

Further, a leveling beater, positioned upwardly and forwardly of the main beater, is provided for leveling the material as it is conveyed rearwardly toward the main beater by the conveying device. The leveling beater includes an arrangement of paddles similar in shape to the saw-tooth paddles of the main beater which, in addition to leveling the material, assists the main beater in shredding the material.

Drive means are provided to rotate the main beater, the wide spread distributor beater and the leveling beater in the same direction and such that the wide spread distributor beater is rotated at a faster speed than that of the main beater. It has been found to be beneficial to rotate the wide spread distributor beater 30 to 50 percent faster than the main beater. This increased rotational speed of the wide spread distributor beater imparts an increased momentum to the material as the material leaves the marginal edge portions of the distributor blades thereby providing a wide and uniform spread coverage of the material over the ground.

The improved mechanism provides a manure spreader with the capability of spreading and distributing all types and consistencies of material in an wide spread pattern to the rear and sides of the spreader in a uniform distribution coverage over the ground suitable for top dressing applications. Further, due to the wide spread coverage, soil compaction and damage to crops are minimized in that a smaller number of spreader trips across th field for a given material coverage are required. Still further, another advantage of the present invention is the decrease in amount of time required to unload the spreader thereby resulting in a savings of time and money to the operator.

These and other advantages and attainments of the present invention will become apparent to those skilled in the art upon reading of the following detailed description when taken in conjunction with the drawings wherein there is shown and described an illustrative embodiment of the invention.

BRIEF DESCRIPTION OF THE DRAWINGS

In the course of the following detailed description, reference will be frequently made to the attached drawings in which.

DETAILED DESCRIPTION OF THE INVENTION

In the following description, right hand and left hand references are determined by standing at the rear of the machine facing in a direction of forward travel. Also, in the following description, it is to be understood that such terms "forward," "rearward," "left", "upwardly", etc. are words of convenience and are not to be construed as limiting terms.

IN GENERAL

Figure 1:
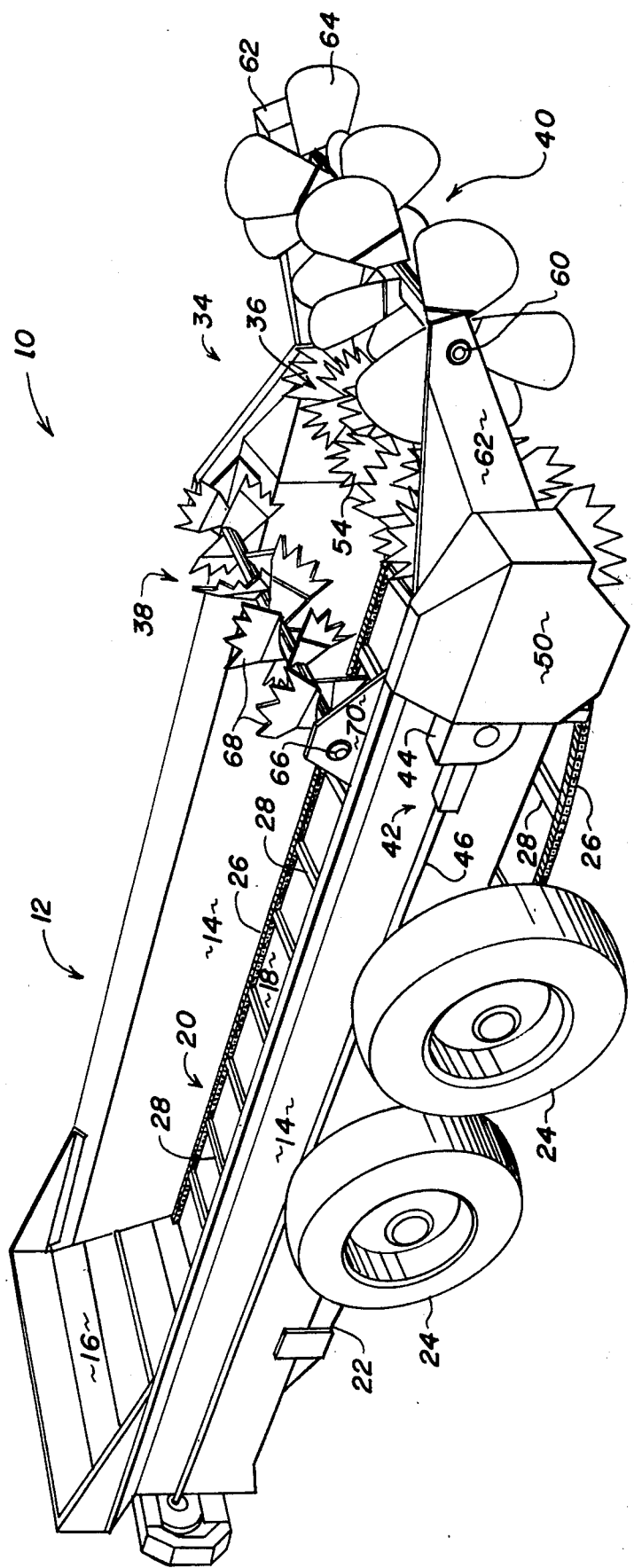
FIG. 1 is a perspective view of a manure spreader embodying the improved spreading and distributing mechanism in accordance with the principles of the present invention.

Referring now to the drawings, and particularly to FIG. 1, there is shown a manure spreader, being indicated generally by the numeral 10, which incorporates the preferred embodiment of the present invention. While the invention is illustrated in a manure spreader having an apron conveyor, it should be understood that the principles of the invention may just as readily be incorporated into any type of manure sreader or similar device.

The manure spreader is of the conventional type which comprises an open-end spreader box 12 having longitudinally extending sidewalls 14, a front wall 16, a floor 18 and an apron conveyor 20. The spreader box 12 is mounted on a frame 22 which is supported for travel across the ground by a left andright pairs of tandem wheels 24, only the left pair of wheels being shown in FIG. 1. The apron conveyor 20 includes a pair of fore-and-aft chains 26 which carry transversely extending slats 28 spaced from each other and operable to advance material in the spreader box 12 from the front wall 16 rearwardly toward the open discharge end. the chains 26 are guided around pairs of spaced-apart front and rear sprockets (the front sprockets not being shown). The rear sprockets 30 are fixed on a apron drive shaft 32 journalled within suitable bearings for rotation between the rear end portion of the sidewalls 14.

Disposed in the vicinity of the open discharge end of the spreader box 12 is the improved spreading and distributing mechanism 34 which basically comprises a main beater 36, an upper leveling beater 38 and a wide spread distributor beater 40, as shown in FIG. 1 of the drawings. The improved mechanism 34 will be discussed in detail hereinafter.

Figure 2:
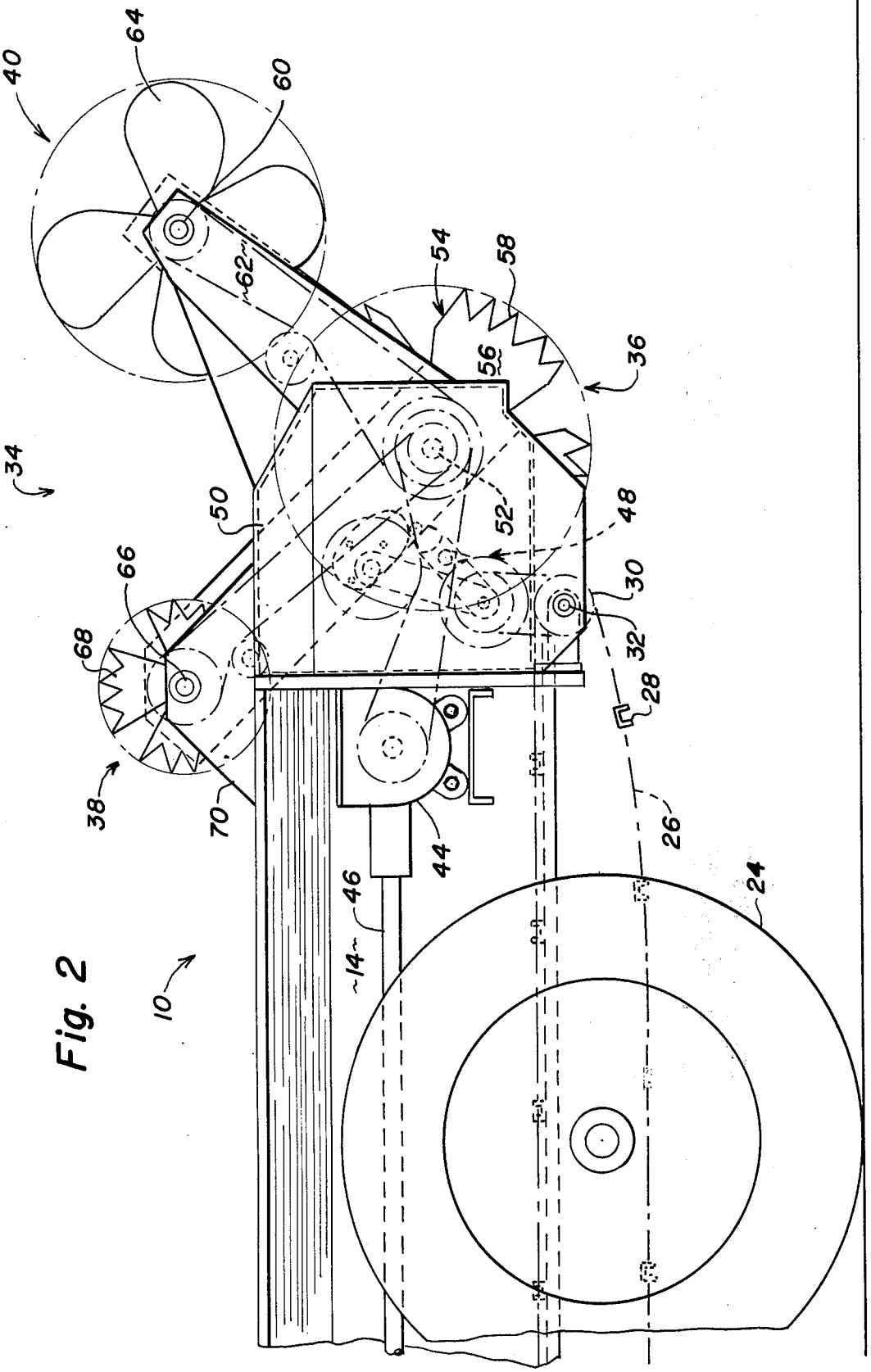
FIG. 2 is an enlarged, fragmentary side elevational view of the spreader of FIG. 1 depicting the drive means in phantom lines.
Figure 3:
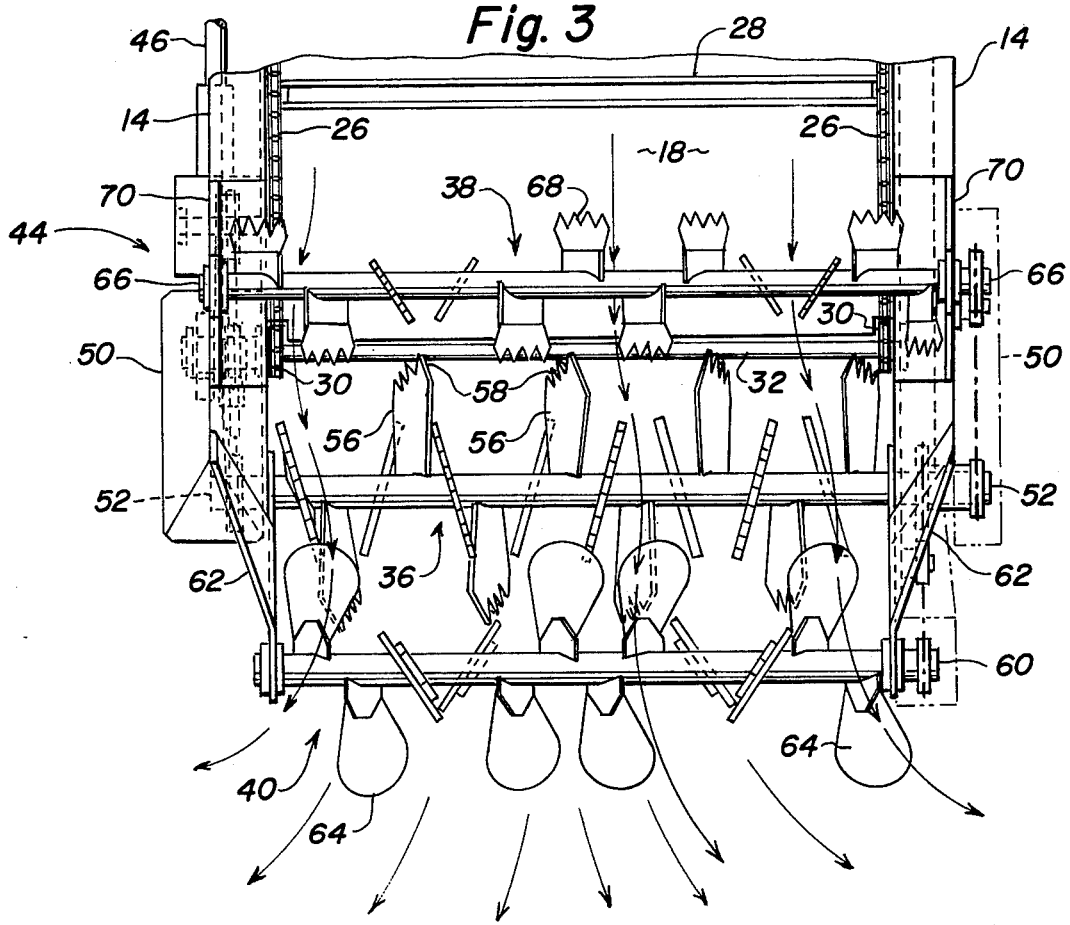
FIG. 3 is a plan view of the rear section of the manure spreader seen in FIG. 2, on a slightly smaller scale.

The improved spreading and distributing mechanism 34, as well as the apron conveyor 28, are driven by conventional drive means 42 which comprises a gear box 44 on the left sidewall 14, a feed input shaft 46 which derives its power from connection with a tractor power-take-off (not shown), a cam rachet mechanism 48 and various chain and sprocket drives as shown in phantom lines in FIGS. 2 and 3. The drive means 42, being conventional, form no part of the present invention and will not be discussed in detail. It should suffice to say that the main beater 36, leveling beater 38 and wide spread distributor beater 40 are all driven by the drive means 42 in the same direction and further that the wide spread distributor beater 40 is driven at a faster speed than the main beater 36. For a detailed description and understanding of the drive means 42, reference is made to U.S. Pat. No. 3,358,936, granted to Smith on Dec. 19, 1967.

A protective cover 50 is provided on each side of the spreader 10 to shield the respective drive components associated therewith. Only the cover 50 on the left side is shown in FIG. 1, the right side cover 50 is shown by dotted lines in FIG. 3.

IMPROVED SPREADING AND DISTRIBUTING MECHANISM

Now, in referring to FIG. 2, the improved spreading and distributing mechanism 34 will be discussed in detail. As noted earlier, the improved mechanism 34 comprises a main beater 36, an upper leveling beater 38 and a wide spread distributor beater 40.

The main beater 36 is transversely disposed in the vicinity of the open end of the spreader box 12 and includes a rotatable shaft 52 journalled within suitable bearings between the upstanding sidewalls 14 of the spreader box 12. Mounted on the shaft 52 is series of right and left paddles 54 being identical except that the ones designated as right are reversed as to the ones designated as left. Each paddle 54 has a generally flat main body portion 56 with a notched outer peripheral edge portion 58. Paddles of such shape are well known in the art and are commonly referred to as "sawtooth", "rooster comb", "bear claw", etc. Examples of such shaped paddles are shown in U.S. Pat. No. 3,228,701 granted to Smith et al in Jan. 11, 1966; U.S.

Pat. No. 3,175,830 granted to Lepp on Mar. 30, 1965; and in U.S. Pat. No. 3,847,356 granted to Blanshine on Nov. 12, 1974. For a matter of convenience, paddles having a shape and configuration as set forth above will be referred to as "saw-tooth" throughout the remaining portion of this specification.

The saw-tooth paddles 54 are arranged and oriented on the shaft 52 such that upon rotation of the shaft 52, the paddles 54 engage, shred and grip the material as it is fed toward the main beater 36 by the conveying device 20. It has been determined that the saw-tooth paddles 54, like the ones illustrated in the drawings of the preferred embodiment, should be angled at 30 degrees to the longitudinal axis of the shaft for optimum performance.

Positioned upwardly and rearwardly from the main beater 36 is a conventional wide spread distributor beater 40. The wide spread distributor beater 40 comprises a transversely disposed shaft 60 journalled for rotation within suitable bearings between a pair of flat spaced apart plates 62, each of which forms an extension of the respective sidewall 14. The plates or extensions 62 are secured to a respective rear end portion of the sidewalls 14 by suitable means and extend generally upwardly and rearwardly therefrom. A series of distributor blades 64 are mounted obliquely on the distributor shaft 60 and arranged thereon such that upon rotation thereof, material is uniformly distributed to sides and the rear of the spreader 10. In the preferred embodiment, the wide spread distributor beater 40 is of the type found in U.S. Pat. No. 3,295,855 granted to Smith et al on Jan. 3, 1967; however, it should be noted that other conventional types of wide spread distributor beaters could be substituted herewith in keeping with the principles of the present invention.

Figure 4:
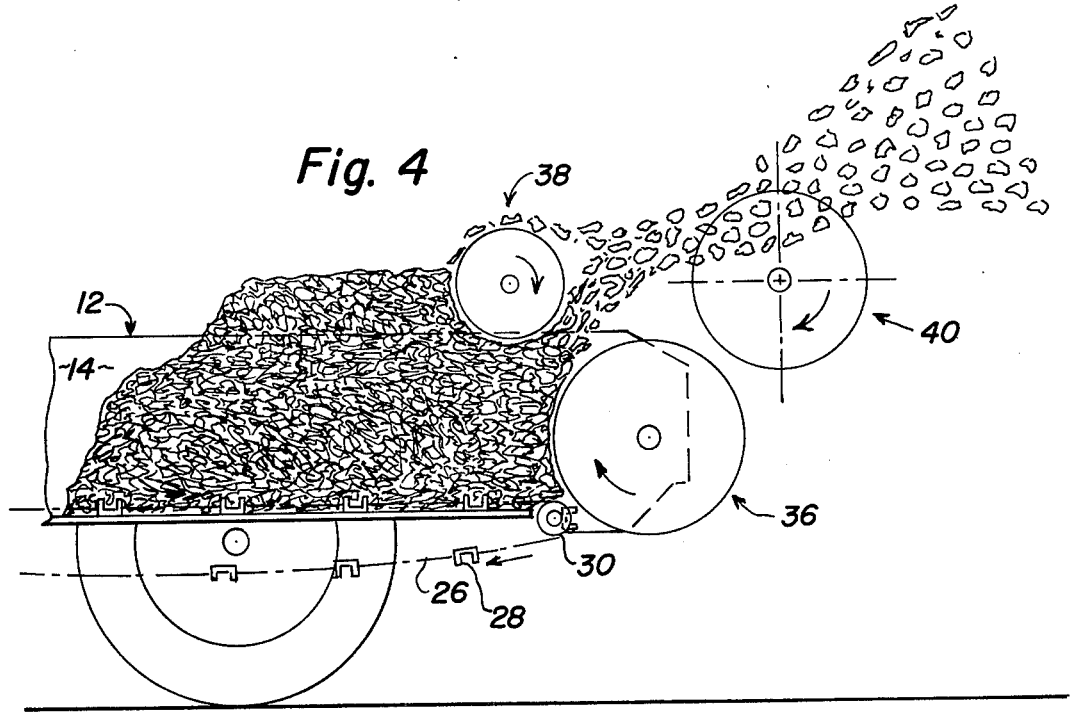
FIG. 4 is a diagrammatical side elevational view of the spreader of FIG. 2 showing the path of manure as it is operated on by the improved spreading and distributing mechanism.

A leveling beater 38, positioned upwardly and forwardly of the main beater 36, has been provided for leveling the load of material as it is advanced rearwardly by the conveying device 20 toward the main beater 36. The leveling beater 38 comprises a rotatable shaft 66 having an arrangement of saw-tooth paddles 68 mounted thereon which are similar in shape and configuration to the paddles 54 of the main beater 36. The leveling beater shaft 66 is journalled within suitable bearings for rotation between side brackets 70 secured to the top edge of the respective sidewalls 14. In addition to leveling the load, the upper leveling beater 38 assists the main beater 36 in shredding the material, which it comes into contact with, into small pieces or particles. The main flow of the material tends to be generally under the leveling beater 38; however, a certain amount of the material passes thereover and rearwardly toward the wide spread distributor beater 40, as seen in FIG. 4.

The basic components of the improved spreading and distributing mechanism 34 and their operational functions have just been described; hereinafter, important interrelationships between the components and results achieved thereby will be discussed in detail.

INTERRELATIONSHIPS PROVIDING IMPROVED SPREAD PATTERN

The spread pattern of the improved spreading and distributing mechanism 34 is generally dependent upon the interrelationship of: the size, shape, and orientation of the saw-tooth paddles 54,68 and of the distributor blades 64; the rotational speed of the beaters 36,38,40 and the rotational direction thereof; and the relative positioning of the beaters. The most crucial relationship being the relative positioning and rotational speed of the wide spread distributor beater 40 with respect to the main beater 36.

The shape and orientation of the saw-tooth paddles 54,66 and of the distributor blades 66 were discussed above. The preferred size relationship of the beaters 36,38,40 is defined by a cylindrical zone described by rotation of each beater, with the cylindrical zone of the leveling beater 38 being smaller than that of the main beater 36 and of the wide spread distributor beater 40, and with the cylindrical zone of the wide spread distributor beater 40 being, in turn, smaller than the cylindrical zone of the main beater 36.

As to the direction and speed of rotation of each beater, it is preferred that all three of the beaters (main 36, leveling 38 and the wide spread 40) be rotated in the same direction, a clockwise direction as indicated by the arrows in FIG. 4. Further, it is preferred, that the wide spread distributor beater 40 be rotated at a faster speed than that of the main beater 36 and that the leveling beater 18 be rotated at a slower speed than that of the main beater 36.

Now, as to the relative positioning of the beaters, (in referring to FIGS. 2 and 4) it is noted above that the main beater 36 is disposed within the vicinity of the open-end of the spreader box 14 to receive the material advance towards it by the conveying device 20, that the leveling beater 38 is positioned upwardly and forwardly from the main beater 36 for leveling the load of material advanced rearwardly toward the main beater 36, and that the wide spread distributor beater 40 is positioned upwardly and rearwardly from the main beater 36 to receive the material discharged from the main beater 36 and to distribute the same to the sides and rear of the spreader box 14.

Further, as to the positioning of the wide spread distributor beater 40, it has been found through actual tests that the most desirable spread characteristic of the wide spread distributor beater 40 is achieved when the wide spread distributor beater 40 is positioned such that the main flow of material discharged by the main beater 36 strikes the marginal edge portions of the distributor blades 64 of the distributor beater 40 when the distributor blades 64 are located within the upper forward quadrant of the cylindrical zone defined by the rotation of the wide spread distributor beater 40. This is best seen in FIG. 4. From the tests conducted, it has been determined that for this ideal positioning, the wide spread beater shaft 60 should lie on an inclined plane which makes an angle between the range of 40°–60° with respect to a horizontal plane that passes through the axes of main beater shaft 52. In other words, the angle of inclination of a plane that passes through the axes of the main beater shaft 52 and the wide spread distributor beater shaft 60 is within a range between 40°–60° with respect to the horizontal plane that passes through the main beater shaft 52. It is further preferred that the vertical distance between the main beater shaft 52 and the wide spread distributor shaft 60 be greater than the horizontal distance therebetween. The angle of inclination of the wide spread distributor shaft 52, in the preferred embodiment, being approximately 51 degrees.

Still further from these tests, the most desirable spreading and distributing characteristics were achieved when the peripheral speed of the wide spread distributor beater 40 was forty percent greater than that of the peripheral speed of the main beater 36. Taking into consideration various distributor blade configurations, a peripheral speed differential of 30 to 50 percent is most desirable.

The interrelationship of the rotational speed and positioning of the wide spread distributor beater 40 was found to be the most critical relationship in providing a suitable wide spread pattern having a uniform distribution. Testing has shown that if the wide spread distributor beater 40 rotates too slowly, the spread width of the material is no wider that the width of the beater; if on the other hand, the widespread distributor beater is rotated too fast, the material is thrown higher and wider than desirable.

Briefly, describing the operation of the improved spreading and distributing mechanism 34, as viewed in FIG. 4, it is seen that when the power of the tractor (now sown) is transmitted to the drive means 42, the main beater 36, the leveling beater 38 and the wide spread distributor beater 40 are rotated all in the same direction as indicated by the arrows. Additionally, the drive means 42 drives the conveyor 28 which moves from the front wall 16 of the spreader box 14 toward the rear discharge opening (as shown by the arrows of FIG. 4).

The material stored in the spreader box 14 is advanced rearwardly to the improved mechanism 34 wherein the upper leveling beater 38 tends to level the load and, in addition, assists the main beater 36 in shredding the material. The major path of the material is under the leveling beater 38 and rearwardly to the main beater 36.

As the material approaches the main beater 36, the saw-toothed paddles 54 thereof aggressively engage and grip the material, tear and shred the material into smaller particles or pieces and then discharge the same overthe top thereof to the wide spread distributor beater 40.

The main flow of material, discharged by the main beater 36, strikes the marginal edge portions of the wide spread distributor beater blades 64 when the blades are located in the upper forward quadrant of a cylindrical zone defined by the rotation of the wide spreader distributor beater 40. Due to the increased rotational speed of the distributor blades 64, and the orientation thereof, the material is scattered or deflected laterally to the sides and to the rear of the spreader 14 in a wide spread pattern of uniform distribution, substantially wider in width that the width of the spreader box 14.

Thus, it can be readily appreciated from the above description, that the present invention sets forth an improved spreading and distributing mechanism for manure spreaders or similar devices which provides the spreader with the capability of spreading and distributing material of all types and consistencies in a wide spread uniform pattern.

Another advantage of the improved mechanism is characterized by the quicker unloading capability of the spreader thereby resulting in a savings of time to the operator.

Still another advantage is realized in manure "top dressing" applications wherein a thin even layer of manure is distributed over seed beds and small seed plants. With the increasing cost of artificial fertilizers, the use of manure has become more important, especially in top dressing applications. In such an operation, the manure should be of a consistency having a small uniform size such that it can be evenly distributed over the ground. Any large lumps or bunches of the manure would cause an uneven distribution thereof and, in addition, cover-up small seed plants which would cause damage thereto. Further, in top dressing applications, it is highly desirable that the manure be spread and distributed in a wide coverage pattern such that the number of trips required by a spreader for a given thickness coverage is minimized thereby decreasing the compaction of the soil and damage to small plants caused by the wheels of the spreader and of the vehicle which tows the spreader across the fields during the spreading operation.

Yet another advantage of the improved mechanism is the simple construction and the feasibility for use on all types and sizes of spreaders, especially the larger ones which have been recently introduced.

It is thought that the invention and many of its attendant advantages will be understood from the foregoing description and it will be apparent that various changes may be made in the form, construction and arrangement of parts of the improved spreading and distributing mechanism described without departing from the spirit and scope of the invention or sacrificing all of its material advantages, the form hereinbefore described being merely an exemplary embodiment thereof.

Having thus described the invention, what is claimed is:

1. In a manure spreader of the type having an open end spreader box mounted on a wheeled frame, a conveying device operable with said box for conveying material placed within said box rearwardly toward the open end of said box, the improvement comprising in combination therewith:

a. a main beater having a rotatable shaft mounted transversely between the sidewalls of said box in the vicinity of said open end, said main beater having a series of saw-toothed paddles arranged such that upon rotation thereof said paddles engage and shred said material as it is advanced rearwardly by said conveying device, the shredded material being directed over the top of said main beater and rearwardly thereof;

b. a wide spread distributor beater having a rotatable shaft with a series of distributor blades arranged thereon, said wide spread distributor shaft is positioned upwardly and rearwardly from said main beater shaft such that a plane passes through the axes of said main and distributor shafts at an angle within a range between 40°–60° with respect to a horizontal plane that passes through said main beater shaft whereby said wide spread distributor beater is positioned in the path of said material discharged from said main beater such that the main flow of said material strikes the marginal edge portion of said distributor blades of said wide spread distributor beater when said distributor blades are located within the upper forward quadrant of a cylindrical zone defined by the rotation of said wide spread distributor beater to thereby spread said material rearwardly and to the sides of said spreader such that said material is evenly distributed over the ground; and c. drive means for rotating said main beater and said wide spread distributor beater in the same directions and such that said wide spread beater rotates 30–50 percent faster than the rotation of said main beater to impart an increased momentum to said material as it is discharged by said wide spread distributor beater thereby effecting a wide spread pattern of the shredded material over the ground.

2. A manure spreader as set forth in claim 1, wherein said wide spread distributor beater is rotated 30 to 50 percent faster than said main beater.

3. A manure spreader as set forth in claim 2, wherein the angle of inclination of a plane that passes through the axes of said main beater shaft and said wide spread distributor beater shaft is within a range between 40°–60° with respect to a horizontal plane through said main beater shaft.

4. A manure spreader as described in claim 1, wherein the diameter of the cylindrical zone defined by rotation of said main beater is greater than that of the cylindrical zone defined by rotation of said wide spread distributor beater.

5. A manure spreader as described in claim 4, wherein the vertical distance between said main beater shaft and said wide spread distributor beater shaft is greater than the horizontal distance therebetween.

6. A manure spreader as set forth in claim 1, wherein said wide spread distributor beater is positioned in the path of said material discharged from said main beater such that the main flow of said material strikes the marginal edge portions of said distributor blades of said wide spreader distributor beater when said distributor blades are located within the upper forward quadrant of a cylindrical zone defined by the rotation of said wide spread distributor beater.

7. A manure spreader as set forth in claim 1, further comprising:

a leveling beater, said leveling beater having a rotatable shaft positioned upwardly and forwardly from said main beater shaft and including a series of leveling paddles arranged on said shaft such that upon rotation thereof by said drive means said leveling paddles level said material as said material is advanced rearwardly toward the open end of said box by said conveying device.

8. A manure spreader as set forth in claim 7, wherein the diameter of the cylindrical zone defined by rotation of said leveling beater is smaller than the diameter of the cylindrical zone defined by rotation of said main beater.

9. A manure spreader as set forth in claim 8, wherein said leveling beater is rotated at a lower rate than the rate of rotation of said main beater and wherein said leveling beater is rotated in the same direction as said main beater and said wide spread distributor beater.

10. A manure spreader as set forth in claim 7, wherein said wide spread distributor beater is rotated 30 to 50 percent faster than said main beater.

11. A manure spreader as set forth in claim 10, wherein said wide spread distributor beater is positioned in the path of said material discharged from said main beater and said upper beater such that the main flow of said material strikes the marginal edge portions of said distributor blades of said wide spread distributor beater when said distributor blades are located within the upper forward quadrant of a cylindrical zone defined by the rotation of said wide spread distributor beater.

* * * * *